No. 877,424. PATENTED JAN. 21, 1908.
J. B. HICKS.
COMBINED PLOW AND FERTILIZER DISTRIBUTER.
APPLICATION FILED SEPT. 9, 1907.
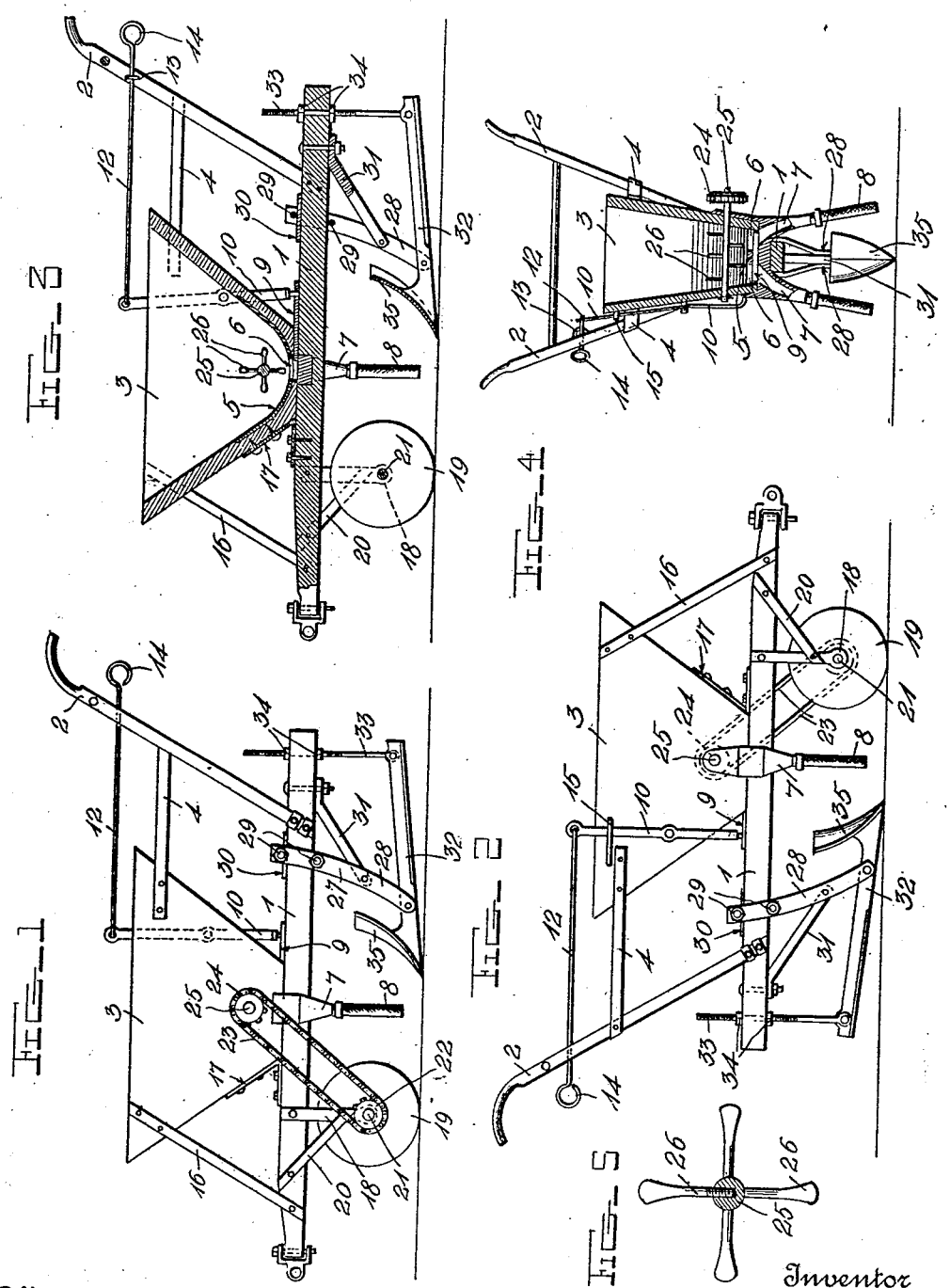
Witnesses
Inventor
John B. Hicks
by H. B. Willson & Co
Attorneys

UNITED STATES PATENT OFFICE.

JOHN B. HICKS, OF WOLF PIT TOWNSHIP, RICHMOND COUNTY, NORTH CAROLINA.

COMBINED PLOW AND FERTILIZER-DISTRIBUTER.

No. 877,424.    Specification of Letters Patent.    Patented Jan. 21, 1908.

Application filed September 9, 1907. Serial No. 392,017.

*To all whom it may concern:*

Be it known that I, JOHN B. HICKS, a citizen of the United States, residing at Wolf Pit township, in the county of Richmond and State of North Carolina, have invented certain new and useful Improvements in a Combined Plow and Fertilizer-Distributer; and I do declare the following to be a full, clear, and exact description of the invention, such as will enable others skilled in the art to which it appertains to make and use the same.

This invention relates to improvements in combined plows and fertilizer distributers.

The object of the invention is to provide a device of this character having means whereby a fertilizer may be distributed on both sides of a furrow, and means whereby the feed of the fertilizer may be regulated.

A further object is to provide a fertilizer distributer having a plow connected therewith, and means to adjust the angle of the plow blade.

With these objects in view, the invention consists of certain novel features of construction, combination and arrangement of parts as will be more fully described and particularly pointed out in the appended claims.

In the accompanying drawings, Figure 1 is a side view of one side of a plow and fertilizer distributer constructed in accordance with the invention; Fig. 2 is a similar view of the opposite side; Fig. 3 is a central vertical longitudinal sectional view; Fig. 4 is a vertical cross sectional view taken through the hopper and the feeding mechanism arranged therein. Fig. 5 is an enlarged detail cross sectional view through the agitator shaft.

Referring more particularly to the drawings, 1 denotes a beam, to the rear end of which are connected suitable handles, 2. On the beam, substantially midway between its ends, is arranged a fertilizer hopper, 3, the rear end of which is connected to the handles, 2, by suitable brace bars, 4. The bottom of the hopper is closed by a curved or segmental feed plate, 5, in which are formed two discharge passages, 6, said passages being arranged on each side of the beam, as shown.

On the underside of the hopper and communicating with the discharge passages, 6, are downwardly-projecting, outwardly-diverging discharge spouts, 7, to which are connected flexible depending feed tubes, 8, which extend downwardly into close proximity to the ground.

Below the feed plate, 5, is arranged a slidably-mounted valve or cut-off plate, 9, to the rear end of which is pivotally connected the lower right-angularly bent end of an operating lever, 10 which is pivotally mounted on one side of the hopper and has connected to its upper end an operating rod, 12, which extends back through a guide loop, 13, arranged on the inner side of one of the handles, as shown. The rear end of the operating rod 12 is provided with an eye, 14, which forms a handle, whereby the same is conveniently operated. The lever 10 is held in position and guided in its movement by means of a guide loop, 15, arranged on one side of the hopper adjacent to its upper end. The forward end of the hopper 3 is securely braced and connected to the forward end of the beam by inclined brace rods, 16, and by an angular iron strap, 17.

Journaled in depending bearing bars, 18, secured at their upper ends to the beam, 1, is a supporting wheel, 19, by means of which the forward end of the beam is supported. The bars 18 are braced by obliquely disposed brace bars, 20, secured at their upper ends to the beam and at their lower ends to said bearing bars, as shown. On one end of the shaft 21, of the supporting wheel, 19, is fixedly mounted a sprocket wheel, 22, which is connected by a sprocket chain, 23, with a sprocket wheel, 24, on one end of an agitator shaft, 25, which is revolubly mounted in suitable bearings arranged in the lower end of the hopper. The shaft 25 extends transversely through the hopper adjacent to its lower end and is provided with a series of radially-projecting agitator fingers, 26, which are preferably flattened at their outer ends and provided on their inner ends with threads, by means of which they are detachably engaged with screw-threaded passages formed in the agitator shaft, as shown.

Connected to the plow beam in rear of the hopper 3 and immediately in front of the lower ends of the handles, 2, is a plow standard, 27, the standard being preferably formed by a pair of flat metal bars, 28, the upper ends of which are arranged on each side of the beam and are secured thereto by clamping bolts, 29, between the upper one of which, and the top of the beam, is arranged a wear-plate, 30. The plow standard, 27, is further connected to the beam 1 by an inclined brace bar, 31, the lower end of which is bolted between the bars, 28, of the standard, while the upper end is bolted to the lower side of the plow beam. Between the lower ends of the bars, 28, is pivotally connected the forward end of a plow shoe, or runner, 32, the rear end of which is adjustably supported by means of an adjusting rod 33, the upper end of which is threaded and passed through a vertically disposed aperture in the plow beam, and on the rod adjacent to the upper and lower sides of the beam are arranged adjusting nuts, 34, which, when screwed up or down on the threaded end of the rod, 33, will raise or lower the rear end of the shoe or runner, 32. On the forward end of the shoe or runner 32 is secured a plow blade or shovel, 35, the position of which is regulated by the adjustment of the rear end of the shoe, 32, thus providing for plowing a deep or shallow furrow.

By providing the double discharge passages and feed tubes for the fertilizer hopper, the fertilizer is distributed on both sides of a furrow and is covered by the plow arranged on the rear end of the beam.

Having thus fully described my invention, what I claim as new and desire to secure by Letters-Patent, is:

1. A combination fertilizer distributer and plow comprising a beam, a fertilizer hopper having discharge passages formed therein on each side of said beam, a valve plate slidably mounted beneath said hopper to regulate the size of said feed passages, an operating lever connected to said valve plate, an operating rod connected to said lever, an agitator shaft revolubly mounted in the hopper, agitator fingers arranged on said shaft to feed the fertilizer through the passages in said hopper, a supporting wheel revolubly mounted in suitable bearings on the forward end of said beam, a sprocket wheel and chain connection between the shaft of said supporting wheel and said agitator shaft, whereby the latter is driven by said supporting wheel, a plow standard arranged on the beam in rear of the fertilizer hopper, a plow shoe or runner pivotally mounted in the lower ends of said standard, a plow blade or shovel secured to the forward end of said runner, and a vertically disposed adjusting rod connected to the rear end of the runner, whereby the same is raised or lowered to regulate the position of the plow blade or shovel, substantially as described.

2. A combined fertilizer distributer and plow, comprising a beam, a fertilizer hopper arranged on the latter, said hopper having discharge passages on each side of the beam, a plow standard secured to said beam in rear of the hopper, a plow shovel on the lower end of said beam, flexible feed tubes connected with the discharge passages in said hopper and adapted to discharge fertilizer in front of and to each side of the plow shovel whereby the latter will open the furrow between the line of fertilizer deposited by the tubes, a valve plate slidably mounted beneath said hopper to regulate the size of the discharge passages therein, a pivoted operating lever connected to said valve, an operating rod connected to said lever and extending back to within reach of the driver, an agitator shaft in said hopper, and radially disposed agitator fingers or blades, detachably connected to said shaft, substantially as described.

In testimony whereof I have hereunto set my hand in presence of two subscribing witnesses.

JOHN B. HICKS.

Witnesses:
A. W. OEKEY,
TH. COVINGTON.